US011288407B2

United States Patent
Jung et al.

(10) Patent No.: US 11,288,407 B2
(45) Date of Patent: Mar. 29, 2022

(54) METHOD AND ELECTRONIC DEVICE FOR CONTROLLING VOLTAGE OUTPUT TO EXTERNAL ELECTRONIC DEVICE ACCORDING TO SIZE OF VOLTAGE DETECTED AT SIGNAL TERMINAL CONNECTED TO EXTERNAL ELECTRONIC DEVICE

(71) Applicant: Samsung Electronics Co., Ltd., Suwon-si (KR)

(72) Inventors: Kuchul Jung, Suwon-si (KR); Kisun Lee, Suwon-si (KR); Cheolyoon Chung, Suwon-si (KR); Hangseok Choi, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/279,271

(22) Filed: Feb. 19, 2019

(65) Prior Publication Data
US 2019/0258832 A1    Aug. 22, 2019

(30) Foreign Application Priority Data
Feb. 21, 2018   (KR) .................. 10-2018-0020360

(51) Int. Cl.
  *G06F 21/81*   (2013.01)
  *G06F 1/26*    (2006.01)
  (Continued)

(52) U.S. Cl.
  CPC .............. *G06F 21/81* (2013.01); *G06F 1/266* (2013.01); *H02J 7/0029* (2013.01);
  (Continued)

(58) Field of Classification Search
  CPC .. G06F 21/81; G06F 1/266; G06F 1/28; H02J 7/0029; H02M 3/158; H02M 3/1582; H02M 2001/0009
  See application file for complete search history.

(56) References Cited

U.S. PATENT DOCUMENTS 7,635,280 B1 * 12/2009 Crumlin ............. H01R 13/7039
                                                                439/489
2008/0265839 A1   10/2008 Yang
                              (Continued)

FOREIGN PATENT DOCUMENTS

EP       2650752 A2       10/2013
KR   10-2011-0131108 A    12/2011
                              (Continued)

OTHER PUBLICATIONS

International Search Report dated May 24, 2019, issued in an International application No. PCT/KR2019/001953.
(Continued)

*Primary Examiner* — Jaweed A Abbaszadeh
*Assistant Examiner* — Gayathri Sampath
(74) *Attorney, Agent, or Firm* — Jefferson IP Law, LLP

(57) ABSTRACT

An electronic device for controlling voltage and a method therefor are provided. The electronic device includes a power regulator, a connector including one or more signal terminals and one or more power terminals electrically connected to the power regulator, and a control circuit electrically connected to the one or more signal terminals. The control circuit is configured to identify a type of an external electronic device connected through the connector, identify detected values for at least some of the one or more signal terminals based at least on the identified type corresponding to a predetermined type, and output, through the power regulator, a predetermined voltage to the external electronic device through the one or more power terminals
(Continued)

based at least on the detected value being within a first predetermined range.

21 Claims, 10 Drawing Sheets

(51) Int. Cl.
    *H02J 7/00*           (2006.01)
    *H02M 3/158*        (2006.01)
    *H02H 3/20*          (2006.01)
    *H02M 1/00*          (2006.01)

(52) U.S. Cl.
    CPC ......... *H02M 3/158* (2013.01); *H02M 3/1582* (2013.01); *H02M 1/0009* (2021.05)

(56) References Cited

U.S. PATENT DOCUMENTS

| | | | |
|---|---|---|---|
| 2009/0200982 A1 | 8/2009 | Hurtz | |
| 2010/0073837 A1 | 3/2010 | Predtetchenski et al. | |
| 2010/0259856 A1* | 10/2010 | Senriuchi | H02J 7/0031 361/49 |
| 2011/0018344 A1* | 1/2011 | Liao | G06F 1/28 307/31 |
| 2011/0293100 A1 | 12/2011 | Stultz et al. | |
| 2012/0210143 A1 | 8/2012 | Amemura | |
| 2012/0254478 A1* | 10/2012 | Wada | H04N 7/104 710/15 |
| 2013/0057216 A1* | 3/2013 | Ribich | H02J 7/0029 320/114 |
| 2013/0275779 A1* | 10/2013 | He | G06F 1/266 713/300 |
| 2013/0286523 A1* | 10/2013 | Mullins | G06F 1/3231 361/93.9 |
| 2014/0111030 A1 | 4/2014 | Chou et al. | |
| 2014/0375419 A1* | 12/2014 | Cho | G06F 21/44 340/5.8 |
| 2015/0234445 A1* | 8/2015 | Yao | G06F 13/4086 710/16 |
| 2016/0026551 A1* | 1/2016 | Kim | G06F 11/3041 713/340 |
| 2017/0040759 A1 | 2/2017 | Zhang | |
| 2017/0242707 A1* | 8/2017 | Hays | G06F 9/4411 |

FOREIGN PATENT DOCUMENTS

| | | |
|---|---|---|
| KR | 10-2014-0010401 A | 1/2014 |
| KR | 10-2016-0051434 A | 5/2016 |
| KR | 10-2017-0096260 A | 8/2017 |
| KR | 10-1801783 B1 | 11/2017 |
| WO | 2017/119876 A1 | 7/2017 |

OTHER PUBLICATIONS

Extended European Search Report dated Dec. 19, 2020, issued in European Application No. 19756742.3.

* cited by examiner

METHOD AND ELECTRONIC DEVICE FOR CONTROLLING VOLTAGE OUTPUT TO EXTERNAL ELECTRONIC DEVICE ACCORDING TO SIZE OF VOLTAGE DETECTED AT SIGNAL TERMINAL CONNECTED TO EXTERNAL ELECTRONIC DEVICE

CROSS-REFERENCE TO RELATED APPLICATION(S)

This application is based on and claims priority under 35 U.S.C. § 119 of a Korean patent application number 10-2018-0020360, filed on Feb. 21, 2018, in the Korean Intellectual Property Office, the disclosure of which is incorporated by reference herein in its entirety.

BACKGROUND

1. Field

The disclosure relates to a method and an electronic device for protecting against overvoltage.

2. Description of Related Art

Recently, the use of electronic devices that can be easily carried, such as smart phones, tablet personal computers (PCs), and wearable devices, has increased, and the electronic devices may be configured to perform various functions. For example, various functions such as voice communication, internet searching, taking photos or videos, music playback, and video viewing may be performed using such electronic devices.

Such an electronic device may be connected to various external electronic devices, and may receive data from the external electronic devices or transmit data to the external electronic devices. Further, the electronic device may receive power from an external electronic device or transmit power to the external electronic device.

The above information is presented as background information only to assist with an understanding of the disclosure. No determination has been made, and no assertion is made, as to whether any of the above might be applicable as prior art with regard to the disclosure.

SUMMARY

Recently, a device referred to as a universal serial bus (USB) killer was released. A USB killer continuously supplies abnormal power to a USB port of an electronic device, which results in the electronic device and the USB port breaking down.

When the USB killer is connected to the USB port of the electronic device, the electronic device enters an inoperable state within 1 to 2 seconds, and overheating and sparks may occur due to overvoltage, depending on the circumstances.

Aspects of the disclosure are to address at least the above-mentioned problems and/or disadvantages and to provide at least the advantages described below. Accordingly, an aspect of the disclosure is to provide an apparatus and method for preventing the electronic device from being damaged due to the use of a malicious device such as a USB killer.

According to various embodiments, it is possible to prevent the electronic device from being damaged due to overvoltage by detecting voltages of at least some of one or more signal terminals of a connector and identifying/determining whether to supply power.

Additional aspects will be set forth in part in the description which follows and, in part, will be apparent from the description, or may be learned by practice of the presented embodiments.

In accordance with an aspect of the disclosure, an electronic device is provided. The electronic device includes a power regulator, a connector including one or more signal terminals and one or more power terminals electrically connected to the power regulator, and a control circuit electrically connected to the one or more signal terminals, wherein the control circuit is configured to identify the type of external electronic device connected through the connector by using a predetermined terminal of the one or more signal terminals, output, through the power regulator, a predetermined output voltage to the external electronic device through the one or more power terminals when the type is a device that requires that power be supplied through the power regulator, detect voltages of at least some of the one or more signal terminals after outputting the predetermined voltage to the external electronic device, maintain outputting the predetermined voltage to the external electronic device through the power regulator when the detected voltage is in a first predetermined range, and at least temporarily stop outputting the predetermined voltage to the external electronic device through the power regulator when the detected voltage is in a second predetermined range.

In accordance with another aspect of the disclosure, an electronic device is provided. The electronic device includes a power regulator, a connector including one or more signal terminals and one or more power terminals electrically connected to the power regulator, and a control circuit electrically connected to the one or more signal terminals, wherein the control circuit is configured to identify the type of external electronic device connected through the connector, identify detected values for at least some of the one or more signal terminals, based at least on the identified type corresponding to a predetermined type, and output, through the power regulator, a predetermined voltage to the external electronic device through the one or more power terminals when the detected value is within a first predetermined range.

In accordance with another aspect of the disclosure, a method of protecting against overvoltage by an electronic device is provided. The method includes identifying the type of external electronic device connected through a connector of the electronic device, identifying detected values for at least some of one or more signal terminals of the connector, based at least on the identified type corresponding to a predetermined type, and outputting a predetermined voltage to the external electronic device through one or more power terminals of the connector when the detected value is within a first predetermined range.

According to various embodiments, it is possible to prevent the electronic device from being damaged due to an overvoltage by detecting voltages of at least some of one or more signal terminals of a connector and determining whether to supply power.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
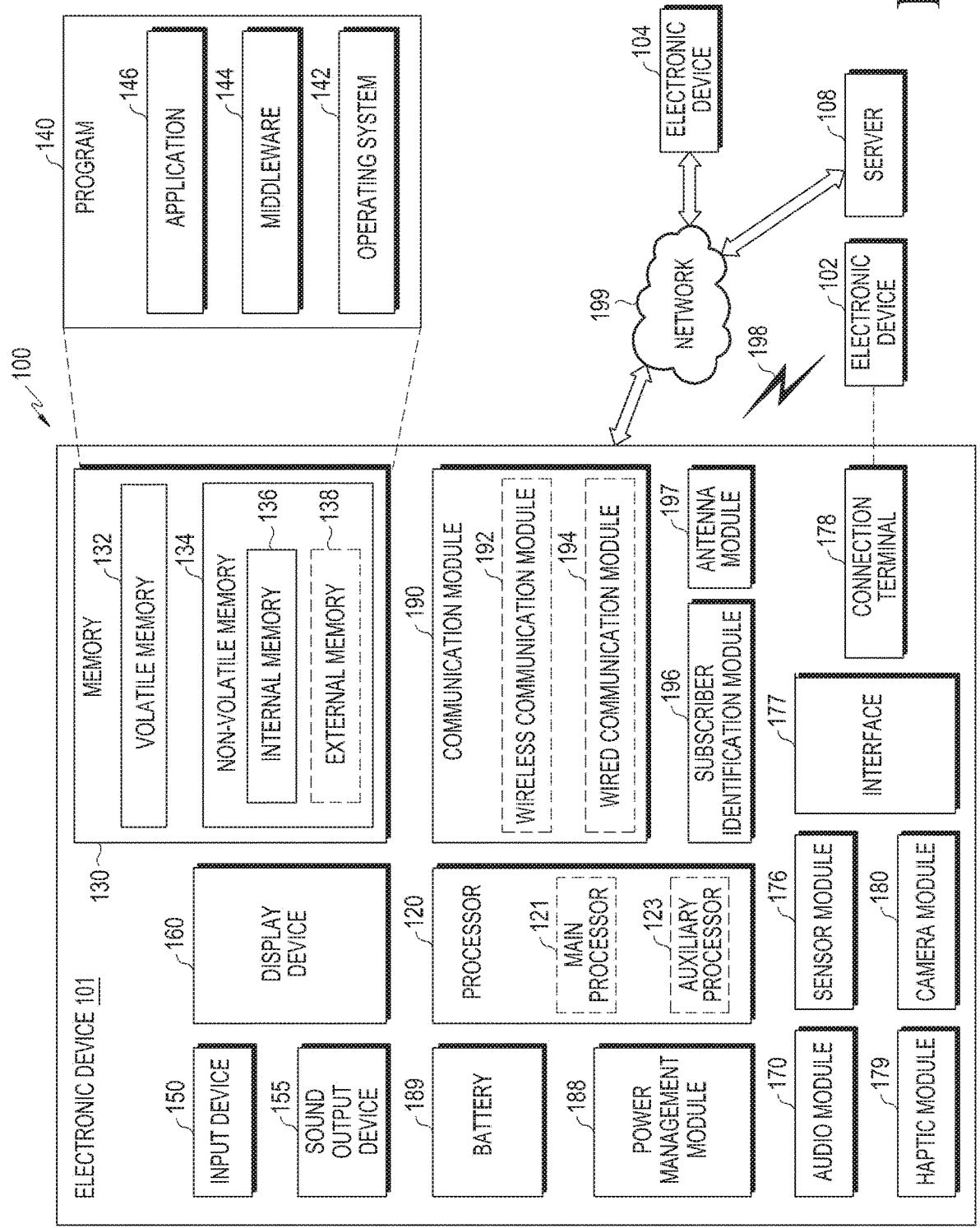
FIG. 1 is a block diagram illustrating an electronic device within a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component(s) (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
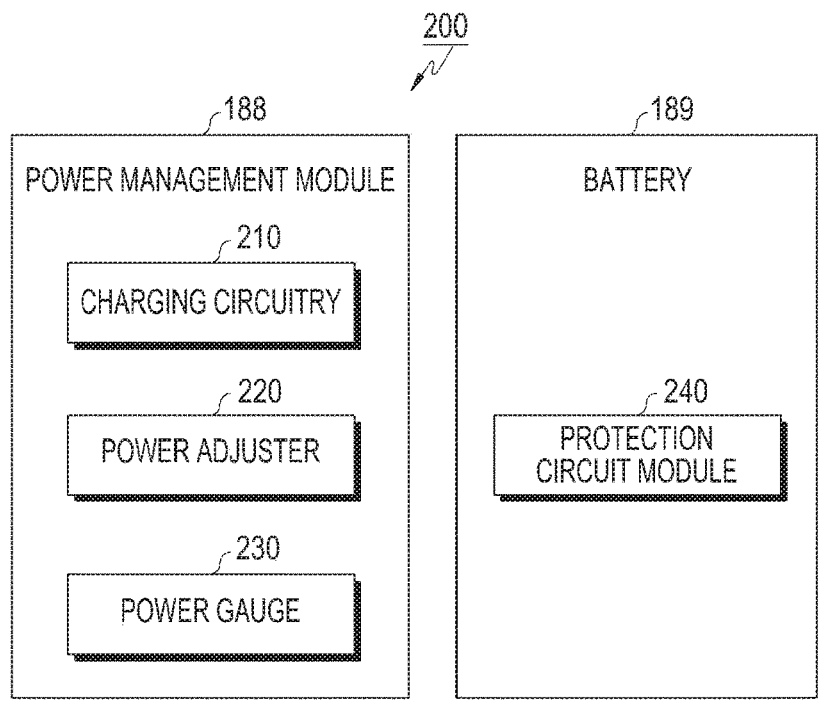
FIG. 2 is a block diagram illustrating a power management module and a battery according to various embodiments of the disclosure.

FIG. 2 is a block diagram 200 illustrating the power management module 188 and the battery 189 according to various embodiments of the disclosure.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power that may be supplied from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may identify/determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
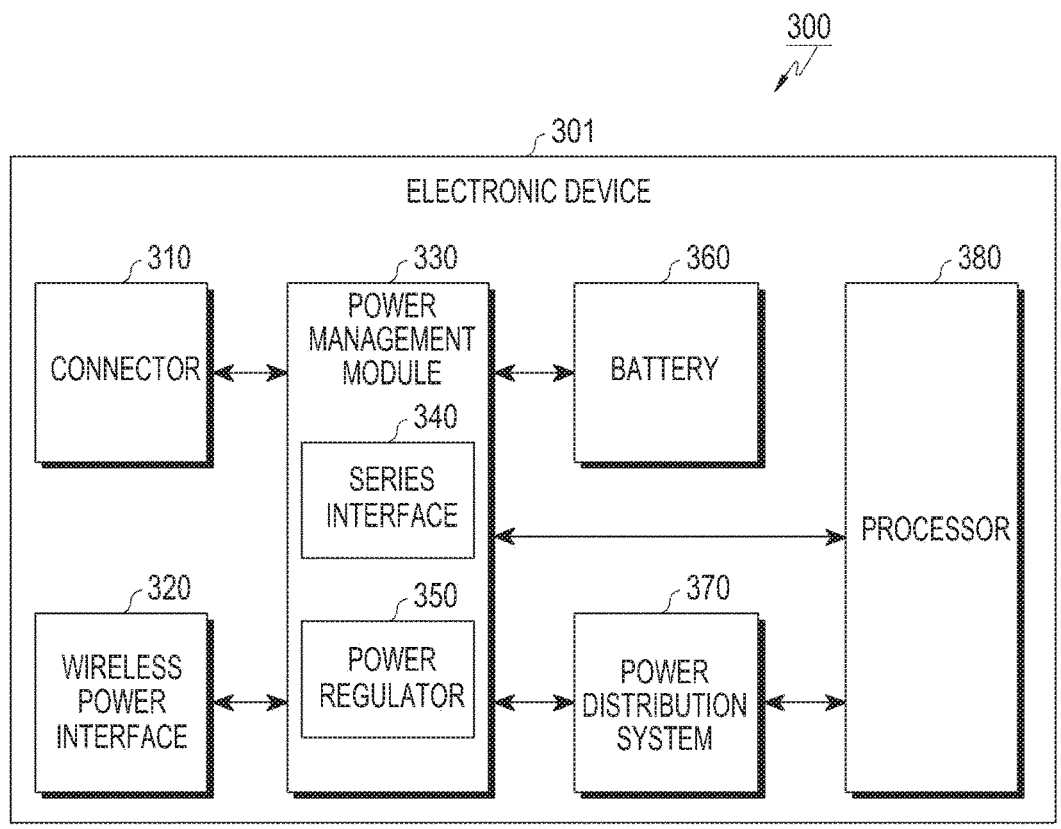
FIG. 3 is a block diagram illustrating an electronic device according to various embodiments of the disclosure.

FIG. 3 is a block diagram 300 illustrating an electronic device according to various embodiments of the disclosure.

Referring to FIG. 3, an electronic device 301 (for example, the electronic device 101) may include a connector 310 (for example, the connection terminal 178), a wireless power interface 320, a power management module 330 (for example, the power management module 188), a battery 360 (for example, the battery 189), a power distribution system 370, and/or a processor 380 (for example, the processor 120). The power management module 330 may include a serial interface 340 (for example, an inter integrated circuit (I2C), an SPI or a universal asynchronous receiver/transmitter (UART)), and a power regulator 350 (for example, the power adjustor 220).

The connector 310 may include one or more signal terminals and one or more power terminals electrically connected to the power regulator 350 of the power management module 330. Hereinafter, the terminals may also be referred to as pins.

According to an embodiment, the electronic device 301 may be connected to an external electronic device (for example, a charger) which supplies external power through the connector 310 or an external electronic device requiring power through a wire.

The wireless power interface 320 may include one or more power terminals electrically connected to the power regulator 350 of the power management module 330.

According to an embodiment, the wireless power interface 320 may include a resonant circuit (for example, a wireless charging coil) for wirelessly connecting to the external electronic device.

According to an embodiment, the electronic device 301 may be wirelessly connected to an external electronic device which supplies external power through the wireless power interface 320 or an external electronic device requiring power.

The serial interface 340 may be electrically connected to one or more signal terminals of the connector 310.

According to an embodiment, the serial interface 340 may configure at least some of the control circuit together with the processor 380. Hereinafter, at least some of the operations of the serial interface 340 may be performed by the control circuit or the processor 380.

Through a predetermined terminal among the one or more signal terminals, the serial interface 340 may identify the type of the external electronic device connected through the connector 310.

According to an embodiment, when the identified type corresponds to a device which requires power, the serial interface 340 may control the power regulator 350 to output a predetermined output voltage to the external electronic device through one or more power terminals.

According to an embodiment, before or after outputting the predetermined voltage to the external electronic device, the serial interface 340 may detect the voltage of at least some of the one or more signal terminals.

According to an embodiment, when the detected value is within a first predetermined range (or the detected value corresponds to/is similar to a predetermined threshold value (for example, a difference of about ±5% or about ±10% between the detected value and the predetermined threshold value) or is higher than or equal to/equal to or lower than the threshold value), the serial interface 340 may control the power regulator 350 to start the operation of outputting the predetermined voltage to the external electronic device or to maintain the predetermined voltage.

According to an embodiment, when the detected voltage is within a second predetermined range (or the voltage corresponds to/is similar to a predetermined threshold value (for example, a difference of about ±5% or about ±10% between the voltage and the predetermined threshold value) or is higher than or equal to/equal to or lower than the threshold value), the serial interface 340 may control the power regulator 350 to at least temporarily stop the operation of outputting the predetermined voltage to the external electronic device, or may not start the operation.

According to an embodiment, when the identified type corresponds to a device which supplies power, the serial interface 340 may control the power regulator 350 to charge the battery 360 using at least part of the voltage received from the external electronic device through one or more power terminals.

The power regulator 350 may charge the battery 360 by controlling a current/voltage of the power received from the external electronic device in a wired or wireless manner.

According to an embodiment, when a USB on-the-go (OTG) device is connected, the power regulator 350 may boost the voltage of the battery to a voltage required by the USB OTG device (for example, 5V) and supply the boosted voltage to the USB OTG device. The USB OTG device may refer to a device serving as a slave in a master (or host)/slave configuration. Alternatively, the USB OTG device may refer to a device configured to select a master (or a host) or a slave through an identification (ID) terminal.

The power distribution system 370 may convert the battery voltage or the voltage of external power into a voltage required by an element within the electronic device 301 and supply the converted voltage to the element.

According to an embodiment, the number of power distribution systems 370 may be plural according to the number/type of elements.

According to an embodiment, the power distribution system 370 may be included in the power management module 330.

The processor 380 may identify the type of the external electronic device connected through the connector 310.

According to an embodiment, the processor 380 may receive information on the type of the external electronic device from the serial interface 340. For example, the serial interface 340 may transmit information on the type of the external electronic device to the processor 380 through I2C communication.

According to an embodiment, the processor 380 may detect the voltage of at least some of one or more power terminals through the power regulator 350. The processor 380 may identify the type of the external electronic device based on the detected voltages.

According to an embodiment, when the identified type corresponds to a device which supplies power or when the detected voltage is within a third predetermined range (or the voltage corresponds to/is similar to a predetermined threshold value (for example, a difference of about ±5% or about ±10% between the voltage and the predetermined threshold value) or is higher than or equal to/equal to or lower than), the processor 380 may control the power regulator 350 to charge the battery using at least a portion of the voltage received from the external electronic device through one or more power terminals.

According to an embodiment, when the identified type corresponds to a device which requires power or the detected voltage is within a fourth predetermined range (or the voltage corresponds to/is similar to a predetermined threshold value (for example, a difference of about ±5% or about ±10% between the voltage and the predetermined threshold value) or is higher than or equal to/equal to or lower than), the processor 380 may control the power regulator 350 to output a predetermined output voltage to the external electronic device through one or more power terminals.

According to an embodiment, the processor 380 may transmit a command (or a control signal) related to power supply/reception (or charging/discharging or buck mode operation/boost mode operation) according to the type of external electronic device to the power management module 330 or the power regulator 350. The power management module 330 or the power regulator 350 may perform power supply/reception (or charging/discharging or buck mode operation/boost mode operation) according to the received command (or control signal).

According to various embodiments, the electronic device 301 may include the power regulator 350, the connector 310 including one or more signal terminals and one or more power terminals electrically connected to the power regulator 350, and the control circuit electrically connected to the one or more signal terminals, wherein the control circuit may be configured to identify the type of the external electronic device connected through the connector 310 by using a predetermined terminal of the one or more signal terminals, output, through the power regulator 350, a predetermined output voltage to the external electronic device through the one or more power terminals when the type is a device that requires that power be supplied through the power regulator 350, detect voltages of at least some of the one or more signal terminals after outputting the predetermined voltage to the external electronic device, maintain output of the predetermined voltage to the external electronic device through the power regulator 350 when the detected voltage is in a first predetermined range, and at least temporarily stop outputting the predetermined voltage to the external electronic device through the power regulator 350 when the detected voltage is in a second predetermined range.

According to various embodiments, the electronic device 301 may include the power regulator 350, the connector 310 including one or more signal terminals and one or more power terminals electrically connected to the power regulator 350, and the control circuit electrically connected to the one or more signal terminals, wherein the control circuit may be configured to identify the type of the external electronic device connected through the connector 310, identify detected values for at least some of the one or more signal terminals, based at least on the identified type corresponding to a predetermined type, and output, through the power regulator 350, a predetermined voltage to the external electronic device through the one or more power terminals when the detected value is within a first predetermined range.

According to various embodiments, the control circuit may be configured to detect whether the external electronic device is connected to the connector 310 through the one or more power terminals.

According to various embodiments, the electronic device may further include the battery 360 connected to the power regulator 350, wherein the control circuit may be configured to identify whether the external electronic device connected through the connector 310 is a device for supplying power to the electronic device 301 through the one or more power terminals, and when it is identified that the external electronic device is a device for supplying power to the electronic device 301, input the received voltage to the power regulator 350 so that the power regulator 350 charges the battery 360 with at least a portion of the voltage received from the external electronic device through the one or more power terminals.

According to various embodiments, the external electronic device may include a first external electronic device and a second external electronic device, the first external electronic device being electrically connected to the one or more power terminals and the one or more signal terminals, the second external electronic device being electrically connected to at least some of the one or more power terminals and the one or more signal terminals through the first external electronic device.

According to various embodiments, the control circuit may be configured to detect voltages of at least some of the one or more signal terminals while the predetermined voltage is output to the external electronic device.

According to various embodiments, the control circuit may be configured to detect voltages of at least some of the one or more signal terminals in a state in which outputting of the predetermined voltage to the external electronic device is stopped.

According to various embodiments, the control circuit may be configured to identify the type of the external electronic device by using a predetermined terminal of the one or more signal terminals.

According to various embodiments, the control circuit may be configured to not output the predetermined voltage to the external electronic device when the detected value is within a second predetermined range.

According to various embodiments, when it is identified that the type of the external electronic device is a USB OTG device, the control circuit may be configured to identify/determine that the predetermined type is satisfied.

According to various embodiments, the at least some terminals may include a terminal for USB data communication, and the predetermined terminal may include an ID terminal for identifying the ID of the external electronic device.

Figure 4:
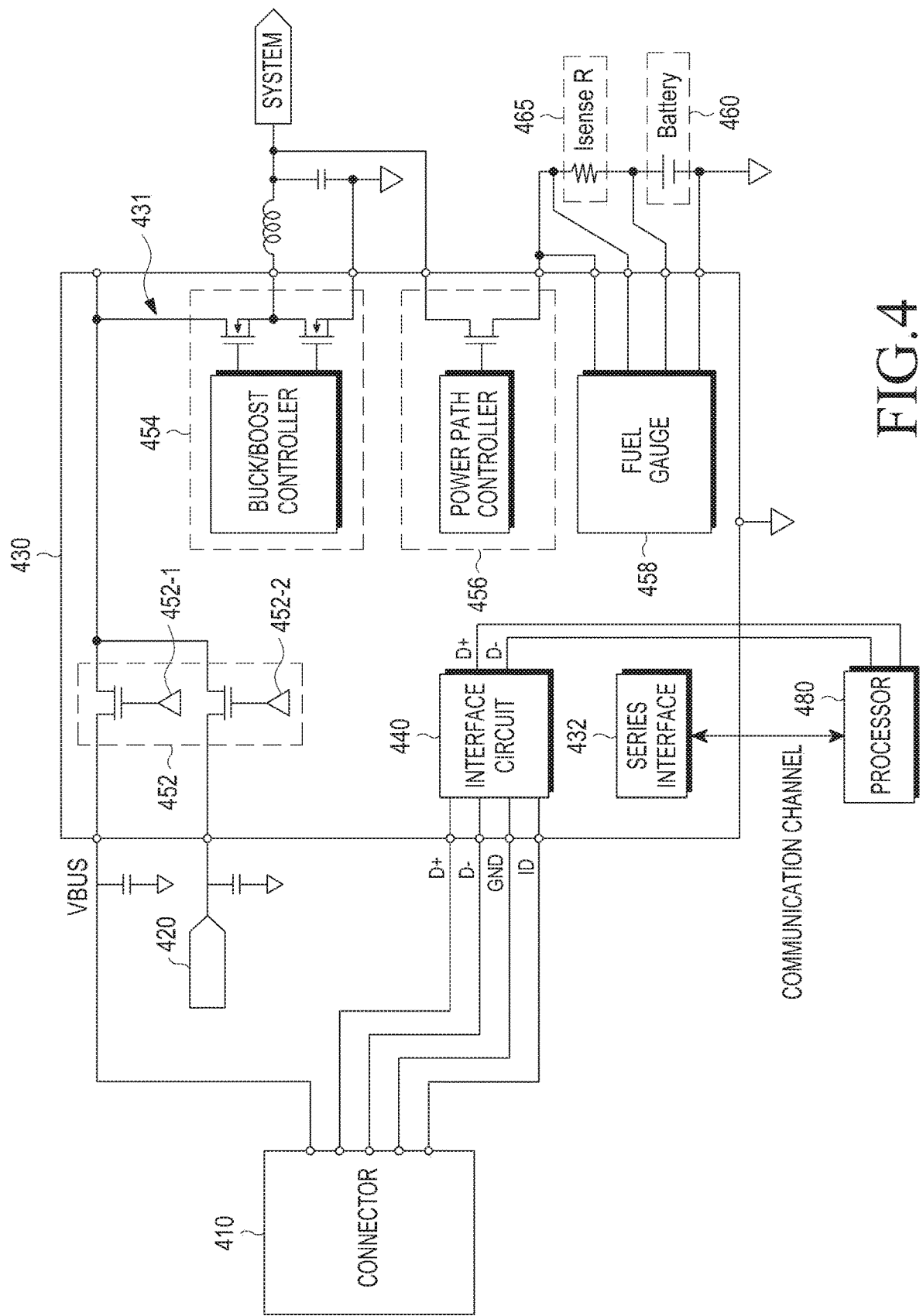
FIG. 4 illustrates the circuit configuration of a power management module according to various embodiments of the disclosure.

FIG. 4 illustrates a circuit configuration of a power management module according to various embodiments of the disclosure.

Referring to FIG. 4, a power management module 430 (for example, the power management module 188 or 330) may be connected to each of a connector 410 (for example, the connector 310), a wireless interface 420, a current sensor 465, a battery 460 (for example, the battery 189 or 360), and/or a processor 480 (for example, the processor 120 or 380).

For example, the connector 410 may be a micro universal serial bus (USB) connector. The connector 410 may be connected to a wired charging device (for example, a travel adaptor (TA)) through a wire.

The wireless interface 420 may include a coil (for example, a conductive pattern) and a wireless charging IC and wirelessly transmit and receive power to and from a wireless charging device (for example, a wireless charging pad). Wireless power may be transmitted and received through a wireless power transmission scheme such as a magnetic field induction coupling scheme, a resonant coupling scheme, or a combination thereof.

The power management module 430 may be electrically connected to the connector 410 (for example, a micro USB connector). The power management module 430 may include a power regulator 431 (for example, the power adjuster 220 or the power regulator 350), a serial interface 432 (for example, I2C, SPI, or UART), and/or an interface circuit 440 (for example, a micro-USB interface).

The power regulator 431 may include an input controller 452, a buck/boost controller 454, a power path controller 456, and/or a fuel gauge 458.

One end of the input controller 452 may be connected to a USB bus voltage (VBUS) terminal of the connector 410 and the other end of the input controller 452 may be connected to the buck/boost controller 454.

The input controller 452 may include one or more switches. According to an embodiment, the input controller 452 may include a wired current input limit switch 452-1 and a wireless current input limit switch 452-2. The wired current input limit switch 452-1 may control a current input from an external wired device through the VBUS terminal of the connector 410. The wireless current input limit switch 452-2 may control a current input from an external wireless device.

The buck/boost controller 454 may perform a control to convert the power input by the input controller 452 into a voltage and a current suitable for charging the battery 460 and to convert the power from the battery 460 into a voltage and a current suitable for being used by the electronic device (for example, the electronic device 101 or 301).

According to an embodiment, the buck/boost controller 454 may boost (or increase) or buck (or decrease) the voltage of the battery 460 in order to provide a predetermined current to a system (for example, a system supplying power to each module of the electronic device) or boost or buck the charging voltage provided for a constant charging current to the battery 460. According to an embodiment, the buck/boost controller 454 may include a buck/boost controller (for example, a buck/boost converter) or one or more switches corresponding to the buck/boost converter.

The power path controller 456 may control a power path to supply power received from an external power source to the battery 460 or control a power path to supply power from the battery 460 to the system.

According to an embodiment, in the state in which the power path controller 456 receives power from the outside, the power path controller 456 may control a power path to supply some of the power from the outside to the battery 460 and the remaining part to the system.

According to an embodiment, when power is supplied from the external power source in an off state of the power of the electronic device, the electronic device may control a power path to supply all power to the battery 460. When power is supplied from the external power source in an on state of the power of the electronic device, the electronic device may control a power path to supply the remaining power of the supplied power except for the power supplied to the system to the battery 460.

According to an embodiment, the power path controller 456 may include a power path controller or one or more switches corresponding to the power path controller.

The fuel gauge 458 may measure the voltage of the battery 460 and measure the charging current and the discharging current of the battery 460.

According to an embodiment, the fuel gauge 458 may directly sense/detect the voltage between negative and positive terminals of the battery 460 or receive a battery voltage sensed/detected by a separate battery voltage sensor. The charging current, according to a charging profile, may be controlled based on the sensed voltage.

According to an embodiment, the fuel gauge 458 may include a current sensor 465 and may measure a charging current and a discharging current of the battery 460 through the current sensor, or measure a charging current and a discharging current of the battery 460 through a separate current sensor 465. For example, the separate current sensor 465 may include a resistance circuit (Isense R) connected to the battery 460.

The serial interface 432 may be connected to an ID terminal of the connector 410. The serial interface 432 may convert data input from the external electronic device into data of an inter-integrated circuit (I2C) communication type/interface. The serial interface 432 may output data of the I2C communication type/interface to the processor 480.

The interface circuit 440 may be electrically connected to one or more signal terminals of the connector 410. For example, the interface circuit 440 may be connected to a D+ terminal, a D− terminal, and/or a GND terminal of the connector 410. The processor may be connected to the D+ terminal and the D− terminal through the interface circuit 440.

Figure 5:
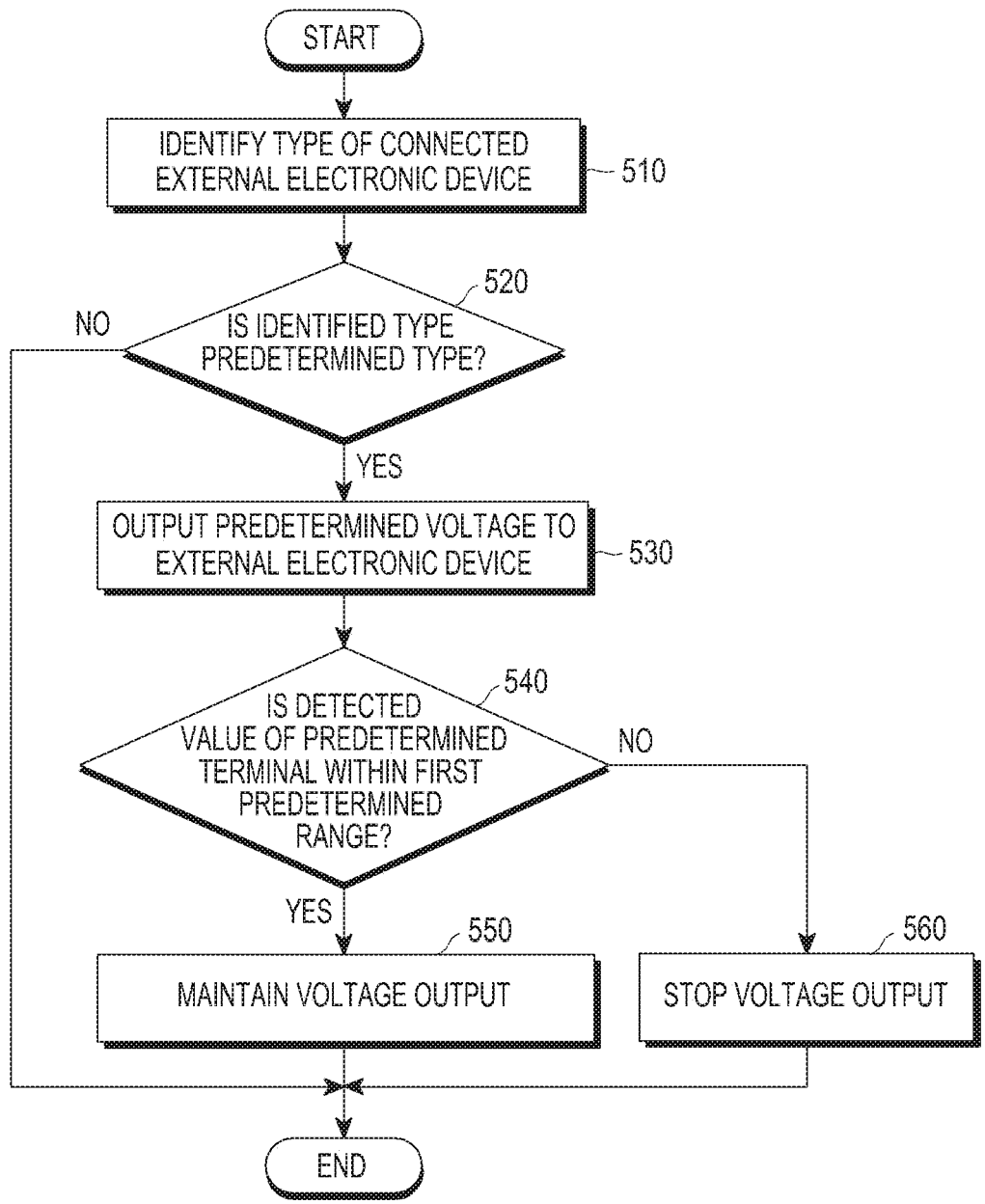
FIG. 5 is a flowchart illustrating an operation method of the electronic device according to various embodiments of the disclosure.

FIG. 5 is a flowchart illustrating an operation method of the electronic device according to various embodiments of the disclosure.

The operation method may include operations 510 to 560. Each step/operation of the operation method may be performed by at least one of the electronic device (for example, the electronic device 101 or 301), at least one processor (for example, the processor 120, 380, or 480) of the electronic device, and the controller/control circuit of the electronic device. According to an embodiment, at least one of operations 510 to 560 may be omitted, the sequences of some operations may be changed, or other operations may be added.

Referring to FIG. 5, in operation 510, the electronic device (for example, the interface circuit 340 or 440, the processor 120, 380, or 480, or the control circuit) may identify the type of the connected external electronic device.

According to an embodiment, the electronic device may detect an input/output (for example, a voltage value, a current value, a resistance value, an impedance value, a capacitance value, or a voltage/current/resistance/impedance/capacitance change rate) of a first predetermined terminal (for example, one or more signal terminals and/or one or more power terminals) from among one or more signal terminals or one or more power terminals of the connector (for example, the connector 310 or 410).

According to an embodiment, when a detected value (hereinafter, referred to as a first detected value) for the first predetermined terminal is within a predetermined range (or the voltage corresponds to/is similar to a predetermined threshold value (for example, difference of about ±5% or about ±10% between the voltage and the predetermined threshold value) or is higher than or equal to/equal to or lower than the threshold value), the electronic device may identify/determine that the external electronic device belongs to a first type (or is a device of a first type).

According to an embodiment, when the first detected value is not within the predetermined range or is within another predetermined range, the electronic device may identify/determine that the external electronic device belongs to a second type (or is a device of the second type).

According to an embodiment, when the detected value for the ID terminal of the connector is within a predetermined range (for example, equal to or lower than about 10 ohm), the electronic device may identify/determine that the external electronic device is a USB OTG device.

According to an embodiment, when the detected value for the VBUS terminal of the connector is about 3.3 V or about 5 V, the electronic device may identify/determine that the external electronic device is a charger (or a USB device capable of supplying power to the electronic device) or that the external electronic device is connected to a charger.

In operation 520, the electronic device (for example, the interface circuit 340, the processor 380, or the control circuit) may identify/determine whether the identified type is a predetermined type.

The electronic device may perform operation 530 when the identified type is the predetermined type (for example, the USB OTG device or the device requiring power supply).

When the identified type is not the predetermined type, the electronic device may terminate the method or perform an operation (for example, receiving power from a power supply device or communicating with a USB master device) corresponding to the identified type of the external electronic device.

According to an embodiment, the electronic device (for example, the interface circuit 340 or 440, the processor 120, 380, or 480), or the control circuit) may control the power regulator (for example, the power adjuster 220 or the power regulator 350 or 432) to receive power from the external electronic device.

According to an embodiment, the electronic device may control the power regulator to charge the battery using at least a portion of the voltage received from the external electronic device through one or more power terminals.

In operation 530, the electronic device (for example, the interface circuit 340 or 440, the processor 120, 380, or 480, or the control circuit) may output the predetermined voltage to the external electronic device.

According to an embodiment, the electronic device may control the power regulator to output the predetermined power/voltage to the external electronic device through one or more power terminals.

According to an embodiment, operation 530 may be omitted. The electronic device may be configured to first output the predetermined voltage to the external electronic device in operation 550.

In operation 540, the electronic device (for example, the interface circuit 340 or 440, the processor 120, 380, or 480, or the control circuit) may identify whether a detected value (hereinafter, referred to as a second detected value) for a second predetermined terminal among one or more signal terminals is within a first predetermined range (for example, is lower than about 0.3 V).

According to an embodiment, the second detected value may include a voltage value, a current value, a resistance value, an impedance value, a capacitance value, or a voltage/current/resistance/impedance/capacitance change rate.

According to an embodiment, the second predetermined terminal may be a D+ terminal and/or a D− terminal of the connector.

According to an embodiment, the second predetermined terminal may be a general-purpose input/output (GPIO) of the processor.

According to an embodiment, the electronic device may identify/determine whether the D+ terminal and the D-terminal of the external electronic device are shorted, and may perform operation 550 when the terminals are not shorted and perform operation 560 when the terminals are shorted.

The identification/determination of whether the terminals are shorted may be based on at least one of two conditions below.

First condition: the case in which a voltage applied to the D− terminal of the connector is 0.3V or higher (or within the second predetermined range) after a predetermined voltage is applied to the D+ terminal of the connector Second condition: the case in which a voltage applied to the D+ terminal of the connector is 0.3V or higher after a predetermined voltage (for example, about 0.6 V) is applied to the D− terminal of the connector The electronic device may identify/determine that the D+ terminal and the D− terminal of the external electronic device are shorted when one or both of the two conditions are satisfied. The electronic device may identify/determine that the D+ terminal and the D− terminal of the external electronic device are not shorted when one or both of the two conditions are not satisfied.

According to an embodiment, the determination of whether the terminals are shorted may be based on at least one of the two conditions below.

First condition: the case in which a predetermined voltage (for example, a high signal) is applied to a first GPIO of the processor and a detected value for a second GPIO of the processor is within a predetermined range or belongs to a high signal condition.

Second condition: the case in which a predetermined voltage (for example, a high signal) is applied to a second GPIO of the processor and a detected value for a first GPIO of the processor is within a predetermined range or belongs to a high signal condition.

The electronic device may identify/determine that the D+ terminal and the D− terminal of the external electronic device are shorted when one or both of the two conditions are satisfied. When one or both of the two conditions are not satisfied or when the detected value for the second GPIO and/or the first GPIO of the processor belongs to a low signal condition, the electronic device may identify/determine that the D+ terminal and the D− terminal are not shorted.

According to an embodiment, while the predetermined voltage is output to the external electronic device, the electronic device may identify whether the second detected value is within the first predetermined range (for example, lower than 0.3 V).

According to an embodiment, in the state in which the operation for outputting the predetermined voltage to the external electronic device is stopped, the electronic device may identify whether the second detected value is within the first predetermined range (for example, lower than 0.3).

According to an embodiment, the electronic device may periodically repeatedly identify the second detected value (and stop the operation for outputting the predetermined voltage).

The electronic device may perform operation 550 when the second detected value is within the first predetermined range and perform operation 560 when the second detected value is not within the first predetermined range.

When the second detected value is within the first predetermined range (or the second detected value corresponds to/is similar to a predetermined threshold value (for example, a difference of about ±5% or about ±10% between the second detected value and the predetermined threshold value) or is higher than or equal to/equal to or lower than the threshold value), the electronic device may control the power regulator to output the predetermined power/voltage to the external electronic device through one or more power terminals or to maintain the output of the predetermined power/voltage in operation 550.

When the second detected value is not within the first predetermined range or is within the second predetermined range (or when the second detected value corresponds to/is similar to a predetermined threshold value (for example, a difference of about ±5% or about ±10% between the second detected value and the predetermined threshold value)), the electronic device may control the power regulator to not start supplying power to the external electronic device or to stop supplying power in operation 560.

According to various embodiments, a method of protecting against overvoltage by an electronic device may include an operation of identifying the type of an external electronic device connected through a connector of the electronic device, an operation of identifying detected values for at least some of one or more signal terminals of the connector, based at least on the identified type corresponding to a predetermined type, and an operation of outputting a predetermined voltage to the external electronic device through one or more power terminals of the connector when the detected value is within a first predetermined range.

According to various embodiments, the type of the external electronic device may be identified using a predetermined terminal of the one or more signal terminals.

According to various embodiments, the method may further include an operation of controlling a power regulator of the electronic device to not output the predetermined voltage to the external electronic device, based at least on the detected value being within a second predetermined range.

According to various embodiments, the method may further include an operation of detecting whether the external electronic device is connected to the connector through the one or more power terminals.

According to various embodiments, the method may further include an operation of identifying whether the external electronic device connected through the connector is a device for supplying power to the electronic device through the one or more signal terminals or the one or more power terminals, and an operation of, when it is identified that the external electronic device is a device for supplying power to the electronic device, charging the battery with power received from the external electronic device through the one or more power terminals.

According to various embodiments, the method may further include an operation of, when it is identified that the type of the external electronic device is a USB on-the-go (OTG) device, determining that the predetermined type is satisfied.

According to various embodiments, the at least some terminals may include a terminal for USB data communication, and the predetermined terminal may include an ID terminal for identifying the ID of the external electronic device.

FIGS. 6, 7A, 7B, 7C, and 8 illustrate the operation of the electronic device according to various embodiments of the disclosure.

Figure 6:
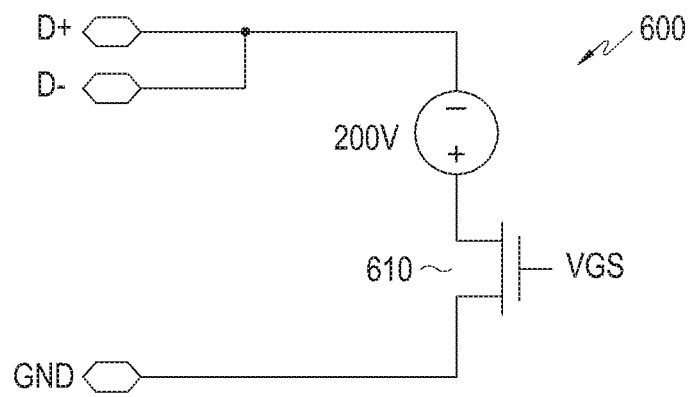
FIGS. 6, 7A, 7B, 7C, and 8 illustrate the operation of the electronic device according to various embodiments of the disclosure.

FIG. 6 illustrates an equivalent circuit 600 of the external electronic device serving as a USB killer. The external electronic device may receive power from the electronic device through the VBUS terminal and generate a high voltage of about −200 V through a flyback converter.

Figure 7A:
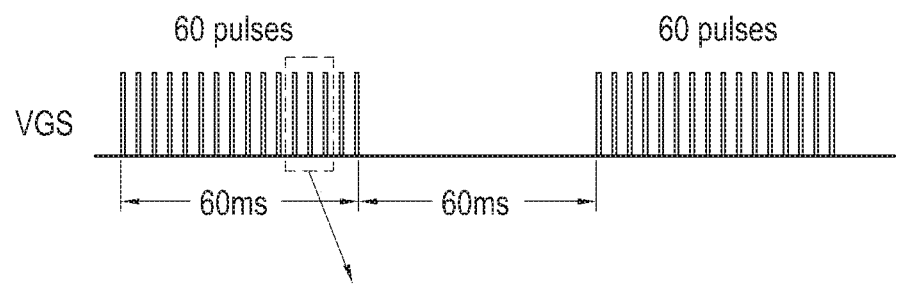
Figure 7B:
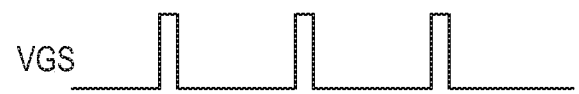

Referring to FIGS. 7A and 7B, a gate-to-source voltage (VGS) including periodic pulses may be applied to a switch 610 of the equivalent circuit.

Figure 7C:
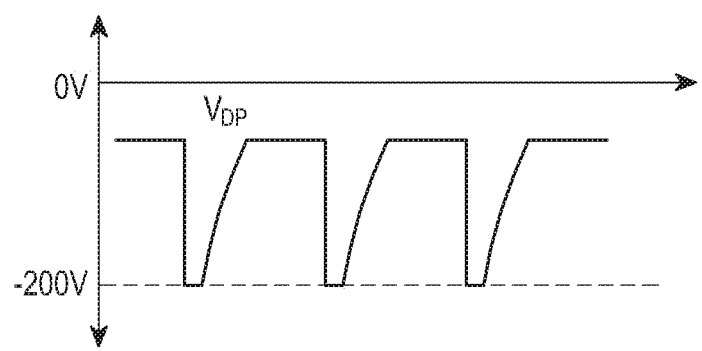

Referring to FIG. 7C, a voltage (VDP) of about −200 V may be applied to a D+ terminal/D− terminal in accordance with the periodic pulses.

Figure 8:
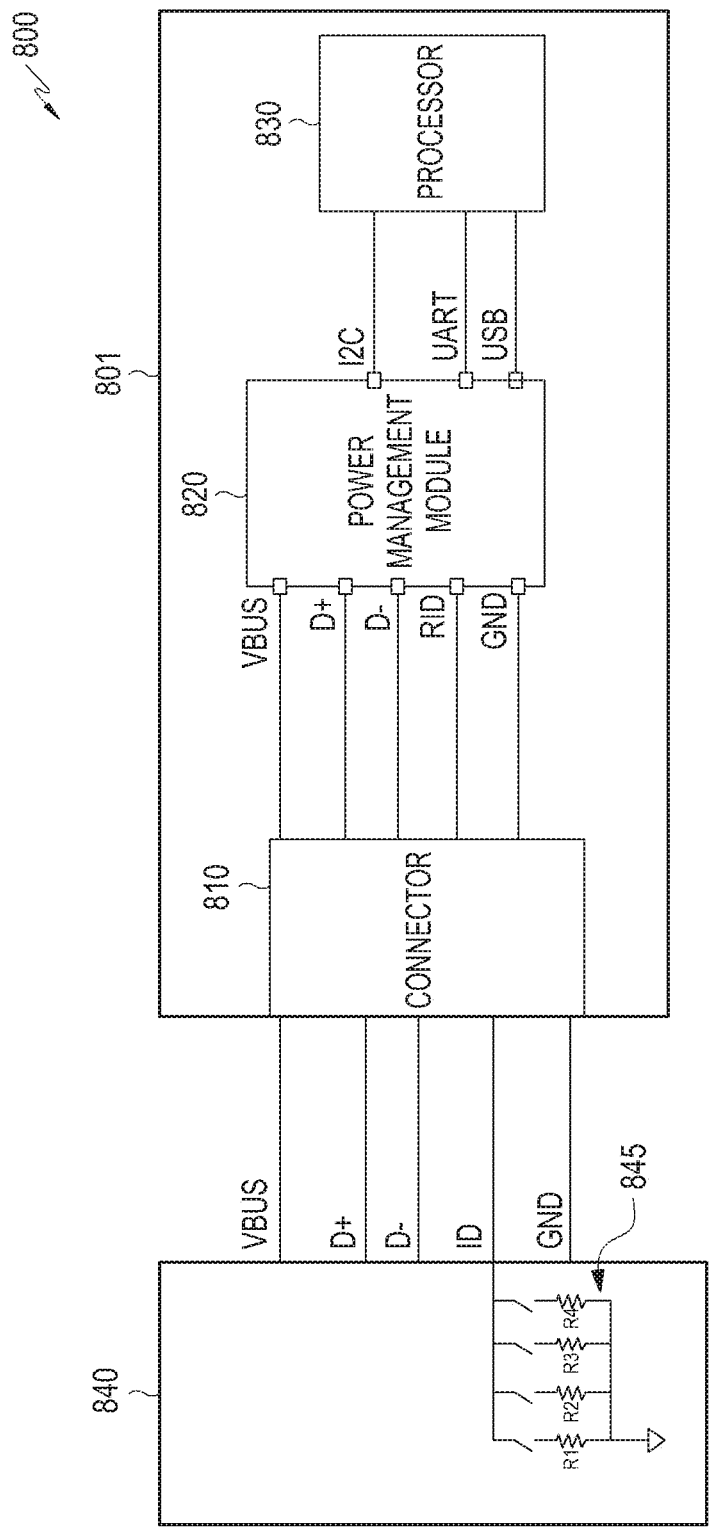

Referring to a block diagram 800 of FIG. 8, an electronic device 801 (for example, the electronic device 101 or 301) may include a connector 810 (for example, the connector 310 or 410), a power management module 820 (for example, the power management module 188, 330, or 430), and/or a processor 830 (for example, the processor 120, 380, or 480).

For example, the connector 810 may be a micro USB connector. The connector 810 may further include a USB Identification (ID) terminal (or pin) in comparison with a standard 4-pin connector.

The external electronic device 840 may include a VBUS terminal for applying a voltage/power, a D+ terminal and a D− terminal for USB data communication, an ID terminal for providing an ID, and a GND terminal. The ID may be expressed as a resistance value for one of the different resistances 845 R1, R2, R3 and R4. For example, an ID of which a resistance value is equal to or smaller than about 10 ohms may indicate a USB OTG device.

The electronic device 801 may identify that a detected value (hereinafter, referred to as a first detected value) for the ID terminal of the connector 810 is within a predetermined range (for example, equal to or smaller than 10 ohm) and that the external electronic device is the USB OTG device.

The electronic device 850 may identify a detected value for the D+ terminal and/or D− terminal of the connector 810 based at least on the identification that the external electronic device is the USB OTG device. The electronic device 801 may identify whether the detected value is within a predetermined range.

When the detected value is within the predetermined range, the electronic device 801 may output the predetermined power/voltage to the external device 840 via the VBUS terminal by using the power management module 820.

When the detected value is not within the predetermined range or is within another predetermined range, the electronic device 801 may control the power management module 820 to not start supplying power to the external electronic device or to stop supplying power.

Figure 9:
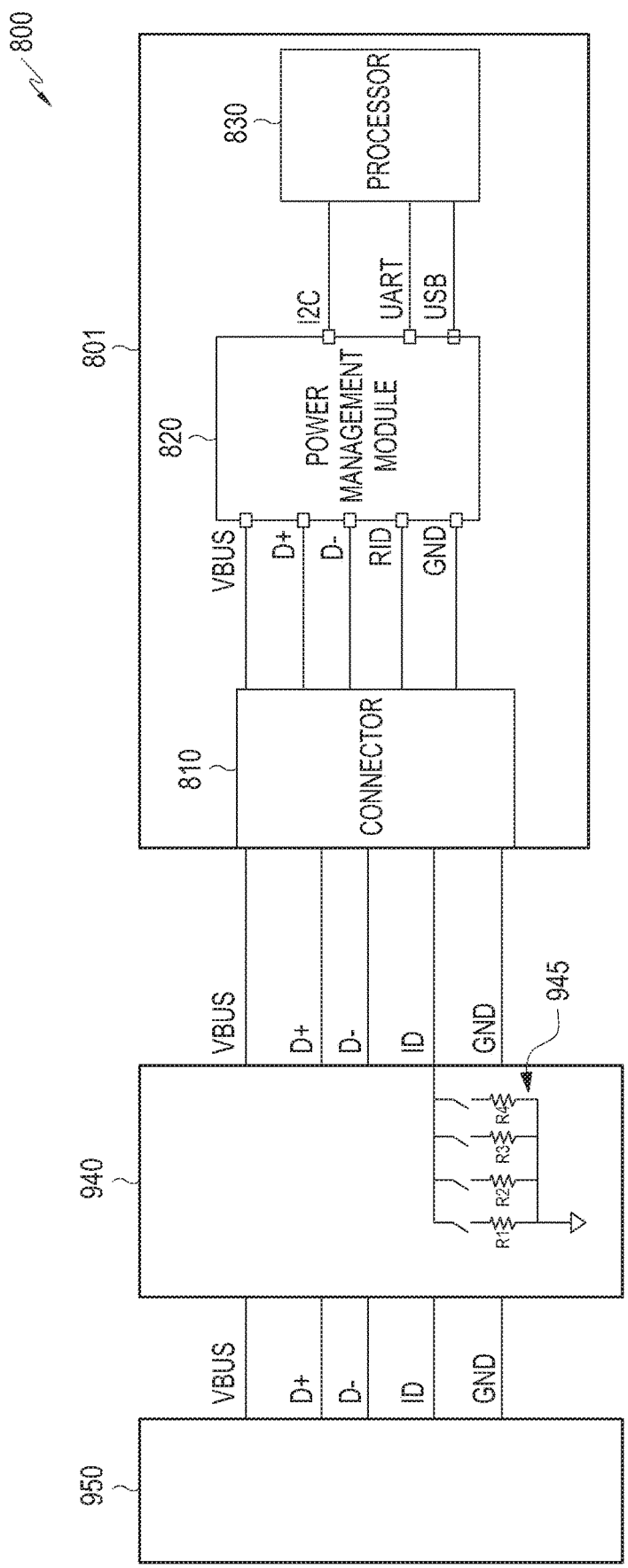
FIG. 9 illustrates a connection between an external electronic device and the electronic device using an adaptor (gender changer) according to an embodiment of the disclosure.

FIG. 9 is a block diagram 900 illustrating a connection between the external electronic device and the electronic device using an adapter according to various embodiments of the disclosure.

Referring to FIG. 9, a second external electronic device 950 may include a VBUS terminal for applying a voltage/power, a D+ terminal/a D-terminal for USB data communication, and a GND terminal.

The connector 810 may further include a USB Identification (ID) terminal (or pin) in comparison with a standard 4-pin connector.

A first external electronic device 940 may function as an adapter, and may include a VBUS terminal (for applying a voltage/power), a D+ terminal and a D− terminal (for USB data communication), an ID terminal for providing an ID, and a GND terminal for connecting with the second external electronic device 950 on one side thereof and include a VBUS terminal, a D+ terminal, a D− terminal, and a GND terminal for connecting with the connector 810 on the other side thereof. The ID may be expressed as a resistance value for one of the different resistances 945 R1, R2, R3 and R4. For example, an ID of which a resistance value is equal to or smaller than about 10 ohms may indicate a USB OTG device.

The second external electronic device 950 may be connected to the connector 810 through the first external electronic device 910.

Figure 10:
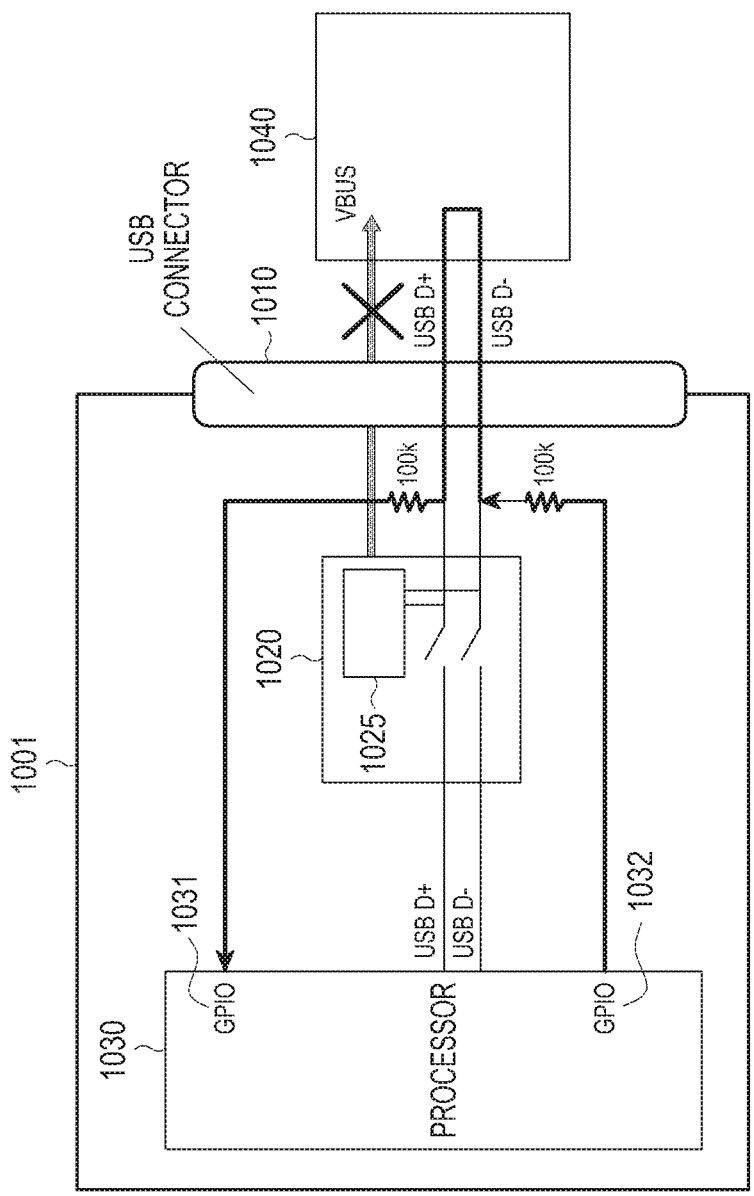
FIG. 10 illustrates an operation method of the electronic device according to various embodiments of the disclosure.

FIG. 10 illustrates an operation method of the electronic device according to various embodiments of the disclosure.

Referring to FIG. 10, an electronic device 1001 (for example, the electronic device 101 or 301) may include a connector 1010 (for example, the connector 310 or 410), a power management module 1020 (for example, the power management module 188, 330, or 430), and/or a processor 1030 (for example, the processor 120, 380, or 480).

The processor 1030 may include a first GPIO terminal 1031 and a second GPIO terminal 1032. The first GPIO terminal 1031 and the second GPIO terminal 1032 may be connected to a D+ terminal and a D− terminal of an external electronic device 1040, respectively, through the connector 1010.

The processor 1030 may apply a high-level signal (or a high signal) to the first GPIO terminal 1031 for a first test and identify whether a detected value for the second GPIO terminal 1032 is a high level or a low level (or satisfies a high signal condition).

The processor 1030 may apply a high-level signal to the second GPIO terminal 1032 for a second test and identify whether a detected value for the first GPIO terminal 1031 is a high level or a low level.

According to an embodiment, when the detected value is within a predetermined range (or the detected value corresponds to/is similar to a predetermined threshold value (for example, a difference of about ±5% or about ±10% between the detected value and the predetermined threshold value) or is higher than or equal to/equal to or lower than the predetermined threshold value), the processor 1030 may identify that the detected value is a high level.

When the result of both the first test and the second test correspond to the high level, the processor 1030 may identify/determine that the D+ terminal and the D− terminal of the external electronic device 1040 are shorted. Hereinafter, the term "short" may refer to the case in which the detected value for the corresponding terminal is equal to or lower than a predetermined threshold value.

based at least on the results indicating that both the first test and the second test correspond to the high level, the processor 1030 may control the power management module 1020 to not start or to stop supplying power to the external electronic device 1040.

based at least on the result indicating that neither the first test nor the second test corresponds to the high level, the electronic device 1001 may output the predetermined power/voltage to the external electronic device 1040 via the VBUS terminal through the power management module 1020.

According to an embodiment, the power management module 1020 may include a protection circuit 1025. The protection circuit 1025 may identify whether the D+ terminal and the D− terminal are shorted in the external electronic device 1040.

When the D+ terminal and the D− terminal are shorted, the protection circuit 1025 may release the connection of the shorted D+ terminal and D− terminal.

Figure 11:
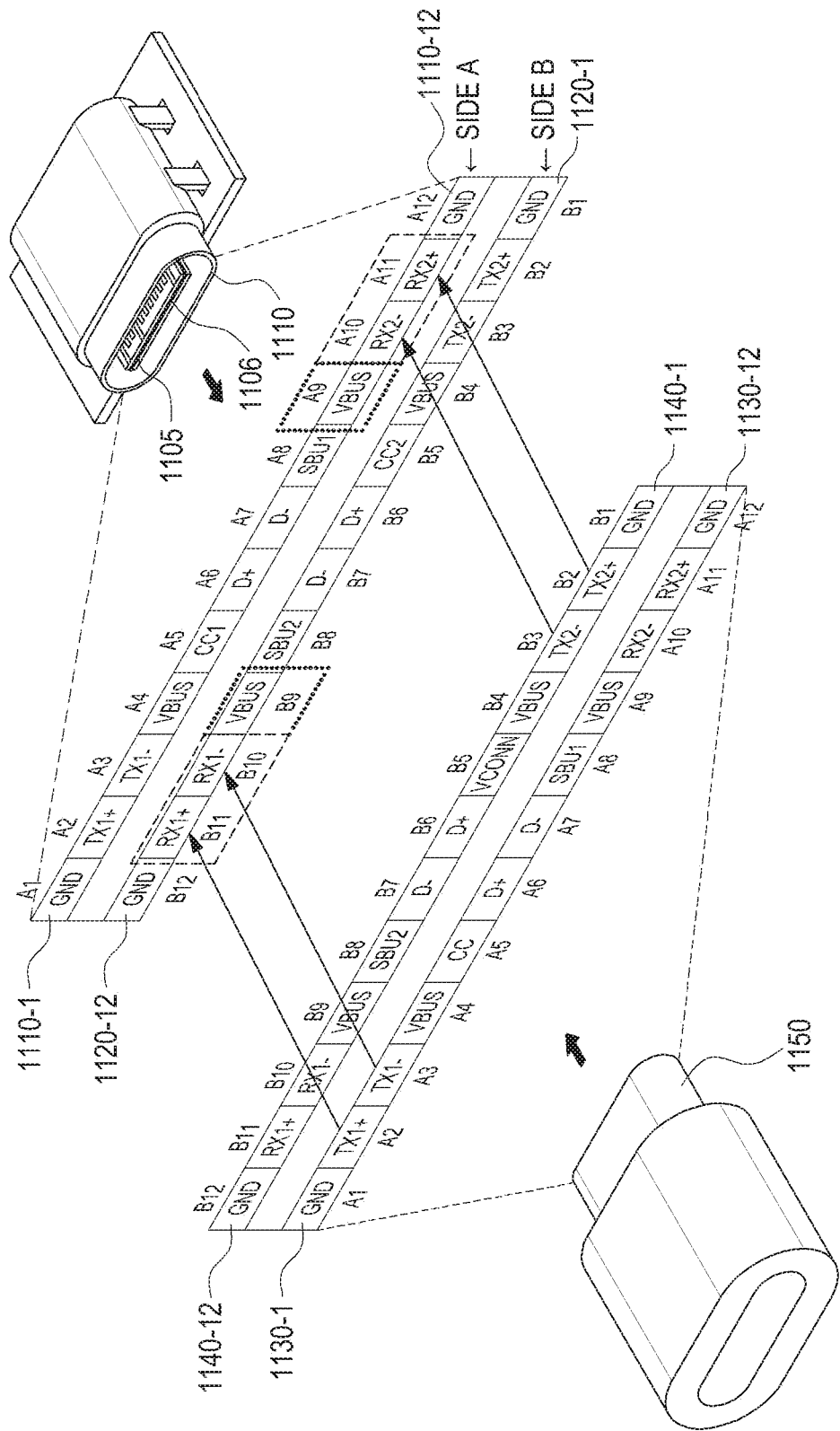
FIG. 11 illustrates a connection between the electronic device and the external electronic device according to various embodiments of the disclosure.

FIG. 11 illustrates a connection between the electronic device and the external electronic device according to various embodiments of the disclosure.

Referring to FIG. 11, the electronic device (for example, the electronic device 101 or 301) may be electrically connected to the external electronic device (for example, the electronic device 102 or the electronic device 104) through a first connector 1110.

The first connector 1110 of the electronic device may be formed in appearance such that a second connector 1150 of the external electronic device can be inserted therein in any of forward and backward directions, and a contact substrate 1105 may be formed within the first connector 1110.

be inserted in any direction of the first side and the second side. Due to such a structure, the user can insert the second connector 1150 of the external electronic device into the first connector 1110 of the electronic device in a state of being rotated 180 degrees.

According to an embodiment, the arrangement of the pins formed on the first side (for example, side A) and the second side (for example, side B) of the contact substrate 1105 may be as shown in Table 1 below.

TABLE 1

| Pin No. | Pin No. | Signal Name | Function | Note |
|---|---|---|---|---|
| A1 | B1 | GND | Power | Ground (e.g. Support for 60 W minimum (combined with all VBUS pins)) |
| A2 | B2 | TX1+ or SSTXp1 | USB 3.1 or Alternate Mode | Super speed TX positive (e.g., 10 Gb/s differential pair with TX1−) |
| A3 | B3 | TX1− or SSTXn1 | USB 3.1 or Alternate Mode | Super speed TX negative (e.g. 10 Gb/s differential pair with TX1+) |
| A4 | B4 | VBUS | Power | USB cable charging power (e.g., Support for 60 W minimum (combined with all VBUS pins)) |
| A5 | B5 | CC1, CC2 | CC or VCONN | Identification terminal |
| A6 | B6 | D+ | USB 2.0 | +line of the differential bi-directional USB signal |
| A7 | B7 | D− | USB 2.0 | −line of the differential bi-directional USB signal |
| A8 | B8 | SBU1, SBU2 | Alternate Mode | Side band Use: additional purpose pin (e.g., Audio signal, display signal, and the like) |
| A9 | B9 | VBUS | Power | USB cable charging power (e.g., Support for 60 W minimum (combined with all VBUS pins)) |
| A10 | B10 | RX2− or SSRXn2 | USB 3.1 or Alternate Mode | Super speed RX negative (e.g., 10 Gb/s differential pair with RX2+) |
| A11 | B11 | RX2+ or SSRXp2 | USB 3.1 or Alternate Mode | Super speed RX positive (e.g., 10 Gb/s differential pair with RX2−) |
| A12 | B12 | GND | Power | Ground (e.g., Support for 60 W minimum (combined with all VBUS pins)) |

The contact substrate 1105 may have twelve pins 1110-1, 1110-2, . . . 1110-12 formed on a first side (for example, side A), corresponding to a forward direction, and twelve pins 1120-2, 1120-2, . . . 1120-12 formed on a second side (for example, side B), corresponding to a backward direction. The mid plate 1105 having an electrically conductive characteristic may be disposed inside the contact substrate 1106.

The second connector 1150 of the external electronic device may have twelve pins 1130-1, 1130-2, . . . 1130-12 formed on a first side (for example, A side) contacting the twelve pins 1110-1, 1110-2, . . . 1110-12 formed on the first side (for example, side A) of the contact substrate 1105 and twelve pins 1140-1, 1140-2, . . . 1140-12 formed on a second side (for example, side B) contacting the twelve pins 1120-2, 1120-2, . . . 1120-12 formed on the second side (for example, side B) of the contact substrate 1105. The number of pins in the second connector 1150 of the external electronic device may vary depending on the type of external electronic device. Further, the number of CC pins of the external electronic device may be one or two according to the type thereof. For example, the order of arrangement of the twelve pins formed on the first side (for example, side A) may be the same as the order of arrangement of the twelve pins formed on the second side (for example, side B) such that the second connector 1150 of the external electronic device can The electronic device and/or the external electronic device connected through a type C connector determines whether to operate in a host mode or a device mode through communication using a CC pin.

According to an embodiment, the electronic device and/or the external electronic device may identify/determine whether the electronic device and/or the external electronic device is in the host mode or the device mode through Rp/Rd resistance of the connection through the CC pin. In order to operate as a device for receiving power, the USB killer may use Rd resistance.

According to an embodiment, the electronic device may additionally identify whether a Tx/Rx pin is shorted before starting supplying power based on a detected value of the CC pin. The method of detecting the short may be the same as or similar to a method of checking the short of the D+/D− pin that was described with reference to FIG. 10. When the Tx/Rx pin is shorted, the electronic device may stop supplying power to the external electronic device. The electronic device may also identify/check the D+/D− pin in addition to identifying/checking the short of the Tx/Rx pin.

Figure 12:
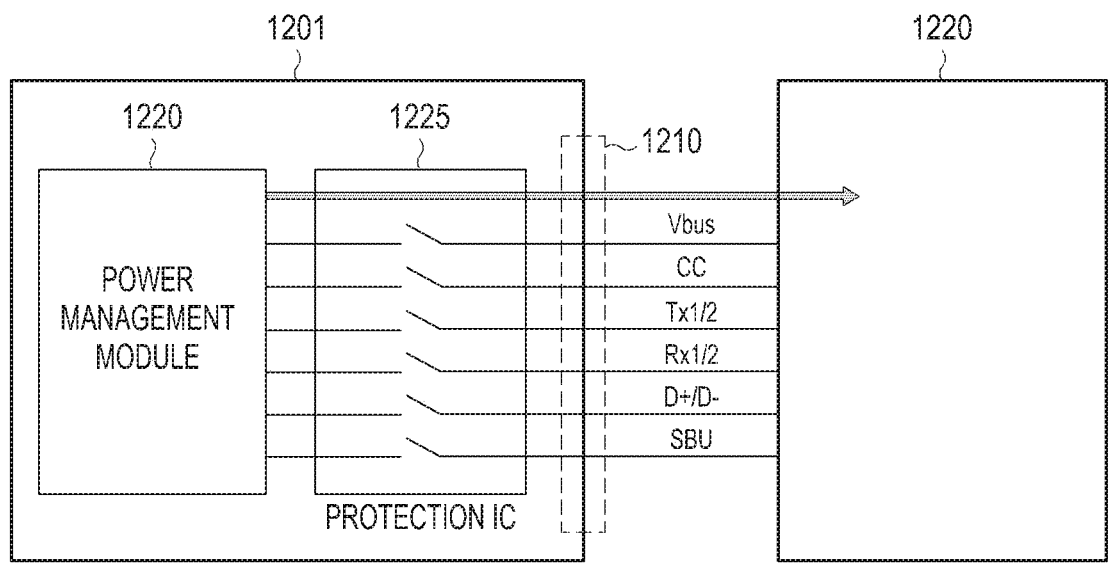
FIG. 12 illustrates a protection circuit of the electronic device according to various embodiments of the disclosure.

FIG. 12 illustrates a protection circuit of the electronic device according to various embodiments of the disclosure.

Referring to FIG. 12, an electronic device 1201 (for example, the electronic device 101 or 301) may include a connector 1210 (for example, the connector 310 or 410), a power management module 1220 (for example, the power management module 188, 330, or 430), and/or a protection circuit 1225.

The protection circuit 1225 may be disposed between the connector 1210 and the power management module 1220 and may prevent a voltage (or overvoltage) having a threshold value or higher from being applied to an external electronic device 1240.

According to an embodiment, when the electronic device starts supplying power to the external electronic device 1240 after CC pin communication, the protection circuit 1225 may open a switch between the power management module 1220 and at least one of a CC pin, a Tx1/2 pin, an Rx1/2 pin, a D+/D− pin, and an SBU pin, which are not relevant to power supply, so as to release the corresponding connection.

According to an embodiment, the protection circuit 1225 may identify whether the data pin is shorted in the external electronic device 1240. When the data pin is shorted, the protection circuit 1225 may release the connection of the shorted pin. When the data pin is not shorted, the protection circuit 1225 may connect a pin, which is not shorted, to the power management module 1220 or maintain the connection. For example, when each of the Tx1, Tx2, Rx1, and Rx2 pins is not shorted, the protection circuit 1225 may connect the Tx1, Tx2, Rx1, and Rx2 pins to the power management module 1220 or maintain the connection.

According to an embodiment, the protection circuit 1225 may release the connection between the power management module 1220 and at least one of the CC pin, the D+/D− pin, and the SBU pin so as to prevent voltage having a threshold value or higher (or overvoltage) from being applied from the external electronic device 1240.

Figure 13:
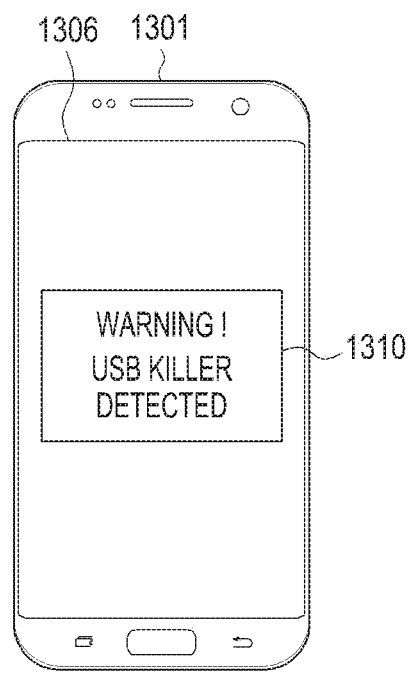
FIG. 13 illustrates an operation method of the electronic device according to various embodiments of the disclosure.

FIG. 13 illustrates an operation method of the electronic device according to various embodiments of the disclosure.

Referring to FIG. 13, an electronic device 1301 (for example, the electronic device 101 or 301) may be connected to the external electronic device through a connector (not shown) (for example, the connector 310 or 410).

The electronic device may identify a detected value for a predetermined terminal of the connector.

When the detected value is not in a first predetermined range or is in a second predetermined range, the electronic device may display predetermined information 1310 (for example, text, image, and/or messages) on a display 1306 (for example, the display device 160 of FIG. 1).

According to an embodiment, when detected values outside of the predetermined range are identified a predetermined number of times or more (within a predetermined time), the electronic device may display the predetermined information 1310 on the display 1306.

According to an embodiment, the electronic device may provide the user with a notification that the external electronic device is causing overvoltage through a visual notification (or a notice) using the display 1306 or a light-emitting diode (LED), an acoustic notification using a speaker, a tactile notification through vibration, and/or transmission of a notification message to the external electronic device.

According to various embodiments, a storage medium storing instructions may be provided. The instructions may be configured to cause at least one circuit to perform at least one operation when executed by the at least one circuit. The at least one operation may include an operation of identifying a type of an external electronic device connected through a connector, an operation of identifying detected values for at least some of one or more signal terminals of the connector, based at least on the identified type corresponding to a predetermined type, and an operation of outputting a predetermined voltage to the external electronic device through one or more power terminals of the connector when the detected value is within a first predetermined range.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a power regulator;
 a connector including one or more signal terminals and one or more power terminals electrically connected to the power regulator;
 a serial interface electrically connected to the one or more signal terminals of the connector; and
 a control circuit comprising at least two terminals electrically connected to the one or more signal terminals,
 wherein the control circuit is configured to:
  identify a type of an external electronic device connected through the connector by using a predetermined terminal of the one or more signal terminals,
  output, through the power regulator, a predetermined output voltage to the external electronic device through the one or more power terminals when the type is a device requiring power supply through the power regulator,
  apply a high-level signal to one of the at least two terminals for a first test, the high-level signal having a voltage greater than a predetermined value,
  apply a high-level signal to another of the at least two terminals for a second test,
  detect voltages of the at least two terminals based on the first test, the second test, and after outputting the predetermined voltage to the external electronic device,
  maintain output of the predetermined voltage to the external electronic device through the power regulator, via the serial interface, based on identifying that the at least two terminals are not shorted when the detected voltages are in a first predetermined range while the external electronic device is connected through the connector, and
  at least temporarily stop outputting the predetermined voltage to the external electronic device through the power regulator, via the serial interface, based on identifying that the at least two terminals are shorted when the detected voltages are in a second predetermined range while the external electronic device is connected through the connector.

2. The electronic device of claim 1, wherein the control circuit is further configured to detect whether the external electronic device is connected to the connector through the one or more power terminals.

3. The electronic device of claim 1, further comprising:
 a battery connected to the power regulator,
 wherein the control circuit is further configured to:
  identify whether the external electronic device connected through the connector is a device for supplying power to the electronic device by using the one or more power terminals, and
  when the external electronic device is identified as the device for supplying power to the electronic device, input received voltage to the power regulator so that the power regulator charges the battery with at least some of the voltage received from the external electronic device through the one or more power terminals.

4. The electronic device of claim 1,
wherein the external electronic device comprises a first external electronic device and a second external electronic device,
wherein the first external electronic device is electrically connected to the one or more power terminals and the one or more signal terminals, and
wherein the second external electronic device is electrically connected to at least some of the one or more power terminals and the one or more signal terminals through the first external electronic device.

5. The electronic device of claim 1, wherein the control circuit is further configured to detect voltages of at least some of the one or more signal terminals while the predetermined voltage is output to the external electronic device.

6. The electronic device of claim 1, wherein the control circuit is further configured to detect voltages of at least some of the one or more signal terminals in a state in which the outputting of the predetermined voltage to the external electronic device is stopped.

7. An electronic device comprising:
a power regulator;
a connector including one or more signal terminals and one or more power terminals electrically connected to the power regulator;
a serial interface electrically connected to the one or more signal terminals of the connector; and
a control circuit electrically connected to the one or more signal terminals,
wherein the control circuit is configured to:
identify a type of an external electronic device connected through the connector,
apply a high-level signal to one of at least two terminals for a first test, the high-level signal having a voltage greater than a predetermined value,
apply a high-level signal to another of the at least two terminals for a second test,
identify detected values for the at least two terminals of the control circuit electrically connected to the one or more signal terminals, based at least on the identified type corresponding to a predetermined type, the first test, and the second test, and
identify whether the at least two terminals are shorted according to the detected values based on one of the first test and the second test or both of the first test and second test,
output, through the power regulator, a predetermined voltage to the external electronic device through the one or more power terminals, via the serial interface, based on identifying that the at least two terminals are not shorted when the detected values is within a first predetermined range based on one of the first test and the second test or both of the first test and second test while connecting to the external electronic device through the connector.

8. The electronic device of claim 7, wherein the control circuit is further configured to identify the type of the external electronic device by using a predetermined terminal of the one or more signal terminals.

9. The electronic device of claim 7, wherein the control circuit is further configured to not output the predetermined voltage to the external electronic device when the detected values based on one of the first test and the second test or both of the first test and second test is within a second predetermined range.

10. The electronic device of claim 7, wherein the control circuit is further configured to detect whether the external electronic device is connected to the connector by using the one or more power terminals.

11. The electronic device of claim 7, further comprising:
a battery connected to the power regulator,
wherein the control circuit is further configured to:
identify whether the external electronic device connected through the connector is a device for supplying power to the electronic device by using the one or more signal terminals or the one or more power terminals, and
when the external electronic device is identified as the device for supplying power to the electronic device, control the power regulator to charge the battery with the power received from the external electronic device through the one or more power terminals.

12. The electronic device of claim 7, wherein, when the type of the external electronic device is identified as a universal serial bus (USB) on-the-go (OTG) device, the control circuit is further configured to identify that the predetermined type is satisfied.

13. The electronic device of claim 8,
wherein the at least some of the one or more signal terminals include a terminal for universal serial bus (USB) data communication, and
wherein the predetermined terminal includes an ID terminal for identifying an ID of the external electronic device.

14. A method of protecting against overvoltage by an electronic device, the method comprising:
identifying a type of an external electronic device connected through a connector of the electronic device;
apply a high-level signal to one of at least two terminals for a first test, the high-level signal having a voltage greater than a predetermined value,
apply a high-level signal to another of the at least two terminals for a second test,
identifying detected values for at least two terminals of a control circuit electrically connected to one or more signal terminals of the connector, based at least on the identified type corresponding to a predetermined type, the first test, and the second test;
identifying whether the at least two terminals are shorted according to the detected values based on one of the first test and the second test or both of the first test and second test; and
outputting a predetermined voltage to the external electronic device through one or more power terminals of the connector, via a serial interface, based on identifying that
the at least two terminals are not shorted when the detected values are within a first predetermined range based on one of the first test and the second test or both of the first test and second test while connecting to the external electronic device through the connector.

15. The method of claim 14, wherein the type of the external electronic device is identified by using a predetermined terminal of the one or more signal terminals.

16. The method of claim 14, further comprising:
controlling a power regulator of the electronic device to not output the predetermined voltage to the external electronic device based at least on the detected values according to one of the first test and the second test or both of the first test and second test being within a second predetermined range.

17. The method of claim 14, further comprising:

identifying whether the external electronic device connected through the connector is a device for supplying power to the electronic device by using the one or more signal terminals or the one or more power terminals; and when the external electronic device is identified as the device for supplying power to the electronic device, charging a battery with power received from the external electronic device through the one or more power terminals.

18. The method of claim 14, further comprising:

when the external electronic device is identified as a universal serial bus (USB) on-the-go (OTG) device, determining that the predetermined type is satisfied.

19. The method of claim 15, wherein at least some of the one or more signal terminals or the one or more power terminals include a terminal for a universal serial bus (USB) data communication, and wherein the predetermined terminal includes an ID terminal for identifying an ID of the external electronic device.

20. The method of claim 15, further comprising:

when the identified type of the external electronic device is not the predetermined type, terminating at least one of receiving power from a power supply device or communicating with a universal serial bus (USB) master device, corresponding to the identified type of the external electronic device.

21. The electronic device of claim 1, wherein the first predetermined range comprises a difference of about ±5% or about ±10% between the detected voltage and a predetermined threshold value.

* * * * *